(12) United States Patent
West

(10) Patent No.: US 6,892,298 B2
(45) Date of Patent: May 10, 2005

(54) LOAD/STORE MICROPACKET HANDLING SYSTEM

(75) Inventor: Lynn P. West, Austin, TX (US)

(73) Assignee: Times N Systems, Inc., Austin, TX (US)

( * ) Notice: Subject to any disclaimer, the term of this patent is extended or adjusted under 35 U.S.C. 154(b) by 425 days.

(21) Appl. No.: 09/915,109

(22) Filed: Jul. 25, 2001

(65) Prior Publication Data

US 2002/0013868 A1 Jan. 31, 2002

Related U.S. Application Data

(60) Provisional application No. 60/220,974, filed on Jul. 26, 2000, and provisional application No. 60/220,748, filed on Jul. 26, 2000.

(51) Int. Cl.[7] .............................................. G06F 13/14
(52) U.S. Cl. .............................. 713/2; 710/22; 710/23; 710/38; 710/123
(58) Field of Search .............................. 713/2; 710/22, 710/26, 38, 123; 711/123; 712/38

(56) References Cited

U.S. PATENT DOCUMENTS

| | | | |
|---|---|---|---|
| 4,486,834 A | | 12/1984 | Kobayashi et al. .......... 364/200 |
| 5,568,609 A | | 10/1996 | Sugiyama et al. ..... 395/183.19 |
| 5,584,010 A | * | 12/1996 | Kawai et al. ................ 711/117 |
| 5,604,882 A | | 2/1997 | Hoover et al. |
| 5,668,943 A | | 9/1997 | Attanasio et al. |
| 5,765,157 A | | 6/1998 | Lindholm et al. |
| 6,122,699 A | * | 9/2000 | Omo et al. .................. 710/308 |
| 6,408,345 B1 | * | 6/2002 | Fuoco et al. .................... 710/22 |
| 6,415,353 B1 | * | 7/2002 | Leung ......................... 711/106 |
| 6,427,195 B1 | | 7/2002 | McGowen et al. |
| 6,594,711 B1 | * | 7/2003 | Anderson et al. ............. 710/22 |

FOREIGN PATENT DOCUMENTS

EP     0 602 791 A2    6/1994    ........... G06F/15/16

OTHER PUBLICATIONS

International Search Report dated Jul. 16, 2002.
International Search Report mailed Jun. 5, 2002 from PCT/US01/23884.
Bershad, et al., "The Midway Distributed Shared Memory System" Compcon Digest of Papers, pp. 528–537, Feb. 22, 1993.
Wilson, et al., "Hardware Assist for Distributed Shared Memory" Proceedings of the International Conference on Distributed Computing Systems, pp. 246–255, May 25, 1993.
Songnian, et al. "Heterogeneous Distributed Shared Memory," IEEE Transactions on Parallel and Distributed Systems, vol. 3, No. 5, pp. 540–554, Sep. 1, 1992.
Nitzberg, et al. "Distributed Shared Memory: A Survey of Issues and Algorithms," IEEE Computer Society, pp. 52–60, Aug. 1, 1991.

(Continued)

Primary Examiner—A. Elamin
(74) Attorney, Agent, or Firm—Gray Cary Ware & Freidenrich LLP

(57) ABSTRACT

Systems and methods are described for a load/store micropacket handling system. A method includes interconnecting a compute node with a shared memory node; translating a processor instruction into an interconnect command; transforming the interconnect command into a direct memory access interconnect command; transmitting the direct memory access interconnect command via a link medium; and performing an operation defined by the direct memory access interconnect command. An apparatus includes a computer network, including: a compute node, having: a compute node interconnect interface unit; and a compute node interconnect adapter; a link medium, coupled to the compute node; and a shared memory node, coupled to the link medium, having: a shared memory node interconnect interface unit; and a shared memory node interconnect adapter.

19 Claims, 3 Drawing Sheets

OTHER PUBLICATIONS

Stumm, et al. "Algorithms Implementing Distributed Shared Memory," IEEE Computer Society, pp. 54–64, May 1, 1990.

Ananthanarayanan, et al. "Experiences in Integrating Distributed Shared Memory with Virtual Memory Management," Operating Systems Review, vol. 26, No. 3, pp. 4–26, Jul. 1, 1992.

Bisiani, et al., "PLUS: A Distributed Shared–Memory System," Proceedings of the Annual International Symposium on Computer Architecture, pp. 115–124, May 28, 1990.

Levelt, "A Comparison of Two Paradigms for Distributed Shared Memory," Software Practice & Experience, vol. 22, No. 11, pp. 985–1010, Nov. 1, 1992.

Ramachandran, et al. "Programming with Distributed Shared Memory," Proceedings of the Annual International Computer Software and Applications Conference, vol. Conf. 13, pp. 176–183, Sep. 20, 1989.

* cited by examiner

LOAD/STORE MICROPACKET HANDLING SYSTEM

CROSS-REFERENCES TO RELATED APPLICATIONS

This application is a continuation-in-part of, and claims a benefit of priority under 35 U.S.C. 119(e) and/or 35 U.S.C. 120 from, copending U.S. Ser. No. 60/220,974, filed Jul. 26, 2000, and Ser. No. 60/220,748, also filed Jul. 26, 2000, the entire contents of both of which are hereby expressly incorporated by reference for all purposes.

BACKGROUND OF THE INVENTION

1. Field of the Invention

The invention relates generally to the field of computer systems. More particularly, the invention relates to computer systems in which the memory (RAM) or a portion thereof is not adjacent to the central processing unit (CPU).

2. Discussion of the Related Art

In a typical computing system, the RAM is essentially adjacent to the CPU, so that wide buses, high-speed paths, and simplistic control means are adequate to achieve excellent transfer performance for data between the RAM and the CPU.

For RAM not physically adjacent to the CPU, one known technology for providing efficient transfer is known as "synchronous coherent interface" (SCI). SCI describes a specific, rather complex set of protocols including directory-based and pointer-passing coherence schemes via a serial link which is suitable for the connection of non-adjacent RAM to a CPU.

A problem with this technology has been that SCI is rather more expensive and elaborate than what is needed in some cases. More importantly, SCI was intended for the connection of multiple CPUs to multiple RAMs, none necessarily adjacent, and to maintain full coherence in an environment where every CPU can access all of the RAM.

Because of this generality, SCI cannot achieve excellent or even good performance for systems where latency is the key performance parameter, and where much of the generality of SCI is not required.

Heretofore, the requirement of protocols and methods to efficiently and correctly process memory accesses to the non-adjacent portion of RAM has not been fully met. What is needed is a solution that addresses this requirement.

SUMMARY OF THE INVENTION

There is a need for the following embodiments. Of course, the invention is not limited to these embodiments.

According to a first aspect of the invention, a method comprises: interconnecting a compute node with a shared memory node; translating a processor instruction into an interconnect command; transforming the interconnect command into a direct memory access interconnect command; transmitting the direct memory access interconnect command via a link medium; and performing an operation defined by the direct memory access interconnect command. According to a second aspect of the invention, an apparatus comprises: a computer network, including: a compute node, having: a compute node interconnect interface unit; and a compute node interconnect adapter; a link medium, coupled to the compute node; and a shared memory node, coupled to the link medium, having: a shared memory node interconnect interface unit; and a shared memory node interconnect adapter. According to a third aspect of the invention, a method, comprises direct memory access by a shared memory node interconnect adapter to a shared memory.

These, and other, embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein like reference numerals (if they occur in more than one view) designate the same elements. The invention may be better understood by reference to one or more of these drawings in combination with the description presented herein. It should be noted that the features illustrated in the drawings are not necessarily drawn to scale.

DESCRIPTION OF PREFERRED EMBODIMENTS

Figure 1:
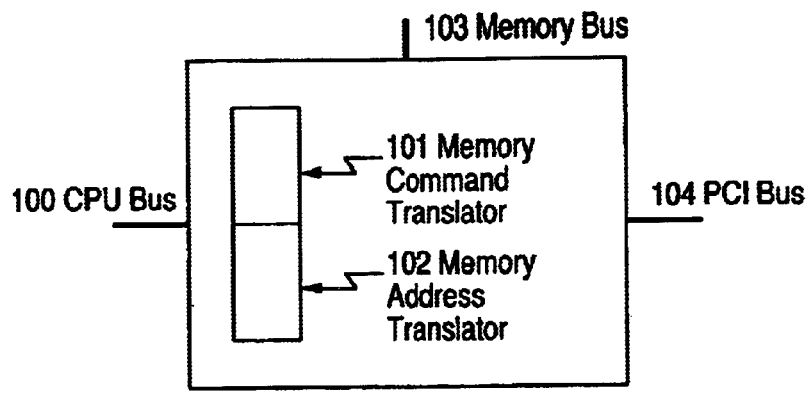
FIG. 1 illustrates a block diagram of a PCI host interface unit, representing an embodiment of the invention.

The invention and the various features and advantageous details thereof are explained more fully with reference to the nonlimiting embodiments that are illustrated in the accompanying drawings and detailed in the following description. Descriptions of well known components and processing techniques are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this detailed description.

The below-referenced U.S. Patent Applications disclose embodiments that were satisfactory for the purposes for which they are intended. The entire contents of U.S. Ser. No. 09/273,430, filed Mar. 19, 1999; Ser. No. 09/859,193, filed May 15, 2001; Ser. No. 09/854,351, filed May 10, 2001; Ser. No. 09/672,909, filed Sep. 28, 2000; Ser. No. 09/653,189, filed Aug. 31, 2000; Ser. No. 09/652,815, filed Aug. 31, 2000; Ser. No. 09/653,183, filed Aug. 31, 2000; Ser. No. 09/653,425, filed Aug. 31, 2000; Ser. No. 09/653,421, filed Aug. 31, 2000; Ser. No. 09/653,557, filed Aug. 31, 2000; Ser. No. 09/653,475, filed Aug. 31, 2000; Ser. No. 09/653,429, filed Aug. 31, 2000; Ser. No. 09/653,502, filed Aug. 31, 2000; Ser. No. 09/912,954, filed Jul. 25, 2001; Ser. No. 09/912,834, filed Jul. 25, 2001; Ser. No. 09/912,872, filed Jul. 25, 2001; Ser. No. 09/912,856, filed Jul. 25, 2001; Ser. No. 09/915,002, filed Jul. 25, 2001; Ser. No. 09/912,870, filed Jul. 25, 2001; Ser. No. 09/912,898, filed Jul. 25, 2001; and Ser. No. 09/912,833, filed Jul. 25, 2001 are hereby expressly incorporated by reference herein for all purposes.

In a system with multiple compute nodes, if the nodes are to be applied to a single parallel application, some means of communication between the nodes must be provided. In a traditional symmetric multiprocessor (SMP), all of the memory is shared and communication between the computer nodes is via primitive Load and Store operations to memory. All Loads and Stores (and all instructions Fetches) at any CPU go to memory, therefore the memory is a significant source of contention and loss of performance.

In a cluster or MMP, the nodes do not share any memory and communications is via "message-passing". Clusters therefore eliminate the memory contention of SMPs, but they trade this advantage for the disadvantage of requiring significant software overhead to formulate and respond to messages. In fact, this disadvantage has, for most parallel applications, been greater than the disadvantage of the SMPs' memory contention, to the point that SMPs have been much more successful commercially that have clusters of MMPs Scardamalia et al in U.S. Ser. No. 09/273,430, filed Mar. 19, 1999 have described a system in which each compute node has its own private, shared memory, but in which there is also provided a shared global memory, accessible by all compute nodes. In this case, memory contention only occurs when nodes are accessing data which is in fact shared, but the system can used primitive CPU Load and Store instructions to access shared memory, so that message-passing overhead is not encountered.

A compute system of the type described in U.S. Ser. No. 09/273,430, filed Mar. 19, 1999 can be designed with shared memory adjacent to each compute node, or it can be designed so that shared memory is not immediately adjacent to any or all of the computer nodes. This invention teaches a hardware interconnect which is well-suited for a system in which the shared memory is not immediately adjacent to any compute node. It will also be obvious to one skilled in the art that such a memory interconnect can be used for any computing system.

The hardware transport system of U.S. Ser. No. 09/273,430, filed Mar. 19, 1999 connects to a standard PCI bus at each processing node. CPU Load and Store instructions are translated by the PCI interface means on the node to PCI READ and WRITE commands, respectively.

Referring to FIG. 1, a standard PCI host interface and certain elements of the interface to the PCI bus are depicted. Element 100 is the standard CPU or "front-side" bus to which the CPU is connected. Element 101 is the memory (Read or Write) command translator provided in the host interface. Element 102 is the memory address translator provided in the host interface. Element 103 is the memory bus at the host interface; and element 104 is the PCI bus connection to the host.

The memory address translator 102 is provided with a large table in which various memory address ranges are stored. A multiplicity of these address ranges are associated with the PCI bus 104. Other of these address ranges are linked to local memory via the memory bus 103.

The memory address table is not static, but rather the ranges are determined by the host system at initialization time via certain standardized tests, including memory reads and writes to certain required memory ranges within each attached PCI adapter.

Figure 2:
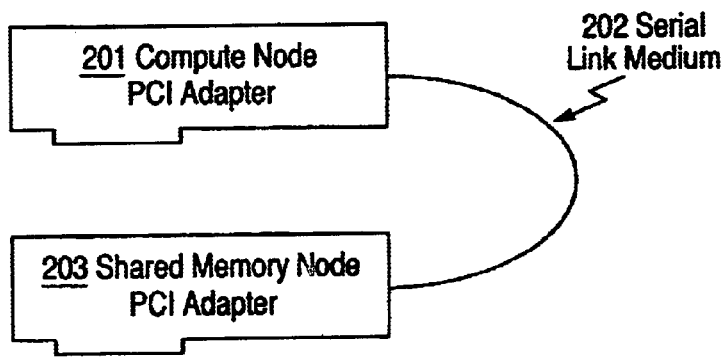
FIG. 2 illustrates a block diagram of the key elements of a micropacket system, representing an embodiment of the invention.

Referring to FIG. 2, elements of a load/store micropacket handling hardware subsystem are depicted. Element 201 is a PCI adapter which is physically connected to the PCI bus in one of the compute nodes. Element 202 is a serial transmission medium. Element 203 is a PCI adapter physically connected to the PCI bus in one of the shared memory nodes. It should be obvious to one skilled in the art that either of the PCI adapters could be integrated into the respective host interface (FIG. 1) or respectively directly to the CPU bus (100) at the processing node of the memory bus (103) at the shared memory node.

Figure 3:
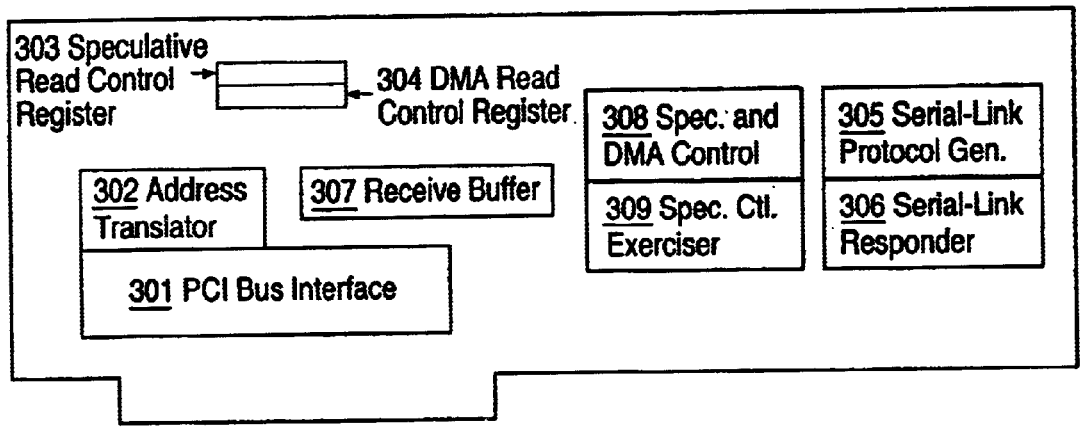
FIG. 3 illustrates a block diagram of a computer-node PCI adapter, representing an embodiment of the invention.

Referring to FIG. 3, a detailed representation of the compute-node PCI adapter of FIG. 2 is depicted. Element 301 is the reference interface to the PCI bus. Element 302 is the address translator. Element 303 is a speculative-read control register. Element 304 is a DMA Read control register set. Element 305 is a serial-link protocol generator. Element 306 is a serial-link protocol responder. And element 309 is a speculative read control exerciser.

Figure 4:
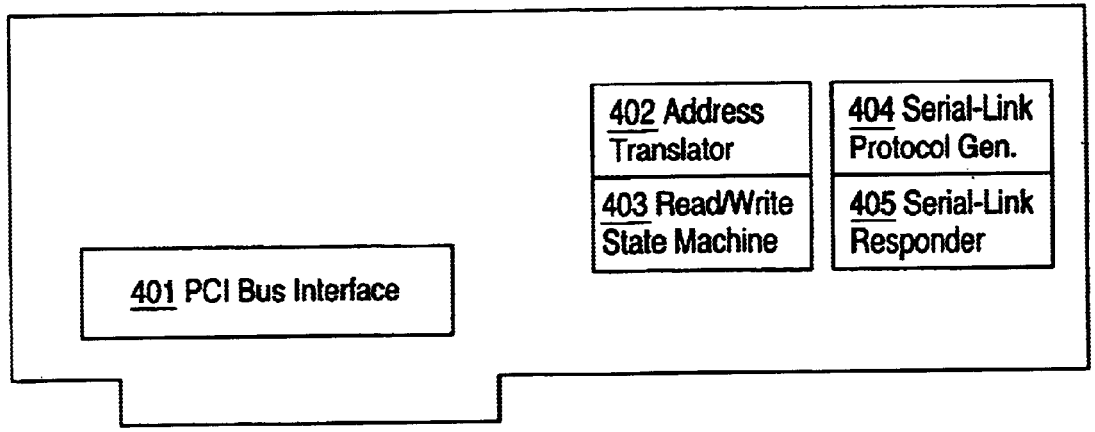
FIG. 4 illustrates a block diagram of a shared-memory-node PCI adapter, representing an embodiment of the invention.

Referring to FIG. 4, a detailed representation of the shared-memory node PCI adapter of FIG. 2 is depicted. Element 401 is the PCI Bus Interface. Element 402 is the address translator. Element 403 is the PCI read/write state machine. Element 404 is the serial-link protocol generator. And element 405 is the serial-link protocol responder.

Note that element 404 is a functional complement of element 305, and similarly element 405 is a functional complement of element 306. Also, it should be noted that most transfers are initiated at the processing node (PRN) adapter. Normally, the shared-memory node (SMN) adapter only reacts to PRN actions.

Normally, when a Write or Read is communicated to the PRN adapter at the PCI interface 301 by the PCI bus from the host 103, the Write or Read is then checked against the Speculative Read Control Register 303 and the DMA Read Control Register 304. Assuming the conditions are not met to do DMA nor speculative Reads, the command is passed to the Serial Link Protocol Generator 305. Here, one of two different actions are taken.

First, for Write commands, the generator 305 can send a Write command across the serial link using the following format: Preamble, Address, Tag, Data, CRC, End. Alternatively, the format can be Preamble, Address, Tag, Data, End. In the latter, error control is augmented by a convolutional error detecting/error correcting code which is embedded throughout the format. As a second alternative, the format can be standard Gigabit Ethernet format, under programmer control, sometimes used for compatibility with other systems.

All transmissions from the PRN to the SMN and from the SMN to the PRN adhere to one or another of the above formats, the only differences being details of the Tag field and the number of bytes of data in the Data field.

The address in the Address field is not the address of some recipient node elsewhere in the system. Instead, it is the address of the specific location of memory in the SMN that is to be Read or Written. It should be noted that this is not message passing. The Tag field contains a command which is either Read or Write. This is a memory Load or Store primitive.

The adapter 203 in this invention performs a function not previously seen in the prior art: it performs remote-party DMA at the shared memory node. That is, the address, command, and data arrive at the adapter 203, and the adapter 203 performs a SMA without reference to any control action at the shared memory node, but at the sole command of adapter 202.

All known message-passing formats in the prior art are much more general, allowing for any of a number of different recipients and allowing for any of a number of different actions. This format addresses the memory allocation directly, and instructs the SMN adapter 203 whether to Load or Store data to/from that location.

For the case where the command is a Write, the generator 305 may take a second action. It may buffer the data, report back to the host that the data has been written, and hold the data for a short period of time. This is commonly referred to as write posting. Similarly, generator 305 may take a third action: it may request that the host "retry" the action at a later time. Typically, generator 305 will take this action for host interfaces which are also known to buffer and post writes.

When generator 305 takes either of these actions, the purpose is to take advantage of locality of reference so as to increase overall system performance. By locality of reference is it meant that when a Write occurs to a particular location, there is a high probability that the next Write will be to the next adjacent location. Therefore, either the generator 305 or the host interface of FIG. 1 will bundle the two Writes into a single Write of two Data elements rather than two separate Writes.

In the system of FIG. 2, this is a great advantage, because of the adapter 203 at the shared memory node. This adapter is a more-passive adapter than is adapter 202; generally adapter 203 just does what adapter 202 tells it to do. Adapter 203 may modify the address in some static fashion for compatibility purposes.

At the shared-memory node, adapter 203 primarily reacts to packets arriving from the adapter 202. It accepts each packet, stores the address field therefrom in a local buffer (a buffer on the adapter 203) and performs a multiplicity of checks on the second field of the packet, the tag field. The first significant check is to determine whether the tag reports that the packet contains a Read Command or whether it contains a Write Command.

In the case of a Write Command, the processing of the packet by adapter 203 initiates two separate processes which proceed in parallel. The first of these is to return the packet to the processing-node adapter (adapter 202). However, before the packet is returned, adapter 203 changes the "request" subfield of the tag field to a "response" indication. Then it recomputes the CRC error protection field associated with the packet and then returns the packet, which now has become an acknowledgement of successful acceptance of the packet.

Simultaneously and in parallel, adapter 203 transfers, using standard PCI protocols, the data in the data field of the packet to the memory within the shared-memory node. The address to which the data is transferred is an algorithmic transformation of the address that is in the arriving packet from adapter 202. One such transformation is to use the arriving address unchanged. In the preferred embodiment, a fixed offset is usually applied to the arriving address, although it can be programmed to avoid adding this fixed offset.

In adapter 203, another kind of packet that can arrive from adapter 202 is a packet in which the tag field contains a Read Command. For packets of this type, the adapter pursues a different process than for Write packets. For a read packet, the tag contains a "length field" which instructs the adapter 203 how much data is to be retrieved from shared memory and passed to adapter 202. In this case, the address field is used as described for Write Commands above, but the PCI protocol followed is a Read protocol, by which adapter 203 transfers data from the shared memory into a buffer present of adapter 203.

After that data is collected within the buffer of adapter 203, a packet is created by adapter 203, using the address and tag field from the incoming packet that initiated the transfer, but changing the "request" to a "response" as above, adding the retrieved data, and recalculating the CRC field.

In the preferred embodiment, the transfer of data back to adapter 202 from adapter 203 in response to a Read packet is actually initiated by adapter 203 before all the data is available in the local buffer, that is while data is still being transferred across the PCI bus of the shared memory node. Means are provided (deliberate miscalculation of the CRC) should some data be required for sequential insertion in the return packet before it has actually been transferred across the PCI bus.

Using this miscalculation will cause the adapter 202 to determine the CRC was bad and re-issue the Read Request packet.

Figure 5:
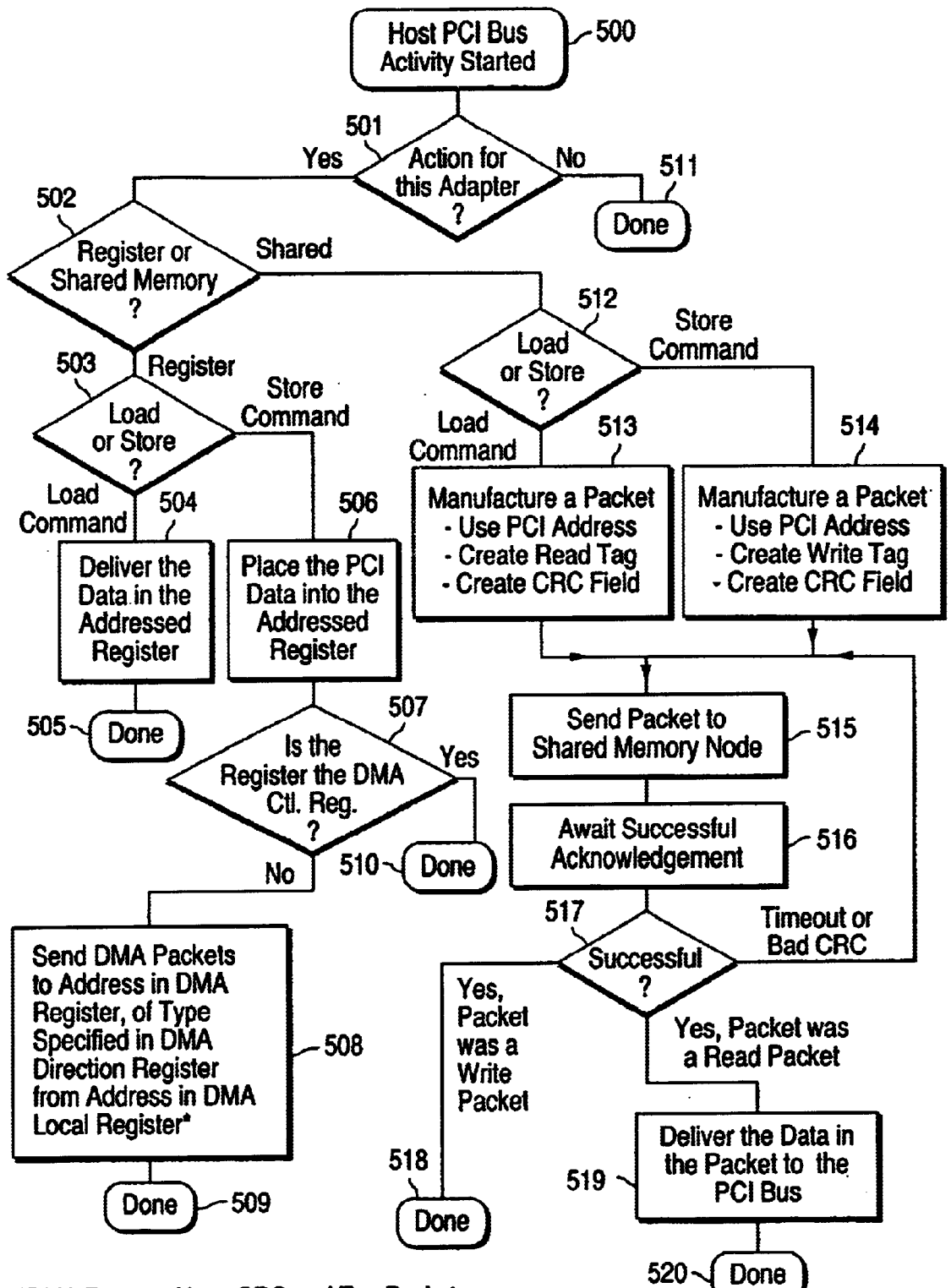
FIG. 5 illustrates a flowchart diagram of processing-node adapter functions, representing an embodiment of the invention.

Referring to FIG. 5, a flowchart of processing-node adapter functions is depicted. Element 500 is coupled to element 501. Element 501 is coupled to elements 502,511. Element 502 is coupled to elements 503,506. Element 504 is coupled to element 505. Element 506 is coupled to element 507. Element 507 is coupled to elements 508,510. Element 508 is coupled to element 509. Element 512 is coupled to elements 513,514. Elements 513,514 are coupled to element 515. Element 515 is coupled to element 516. Element 516 is coupled to element 517. Element 517 is coupled to elements 515,518,519. Element 519 is coupled to element 520.

Still referring to FIG. 5, element 500 is the input to element 501, which identifies whether there is a request for action for the processor-node adapter. If no action is requested, element 511 ends execution of functions. If an action is requested, element 502 identifies whether the request involves registers of shared memory. In the case where a processor requests access to registers, element 503 discriminates between load and store commands. If the request is a Load command, element 504 delivers the data in the addressed register, and element 505 ends execution of functions. If the request is a Store command, element 506 places PCI data into the addressed register. Element 507 checks if the correct DMA register has been used, in which case element 510 ends execution of functions. If the DMA register is not the correct one, element 508 sends DMA packets to address in the DMA register (of type specified in DMA direction register) from address in the DMA local register. Note that the DMA process uses CRC and tag packets in the manner of load and store mechanisms. Element 509 ends execution of functions.

Referring to FIG. 5, if element 502 identifies a request involving shared memory, element 512 discriminates between load and store commands. In either case, elements 513,514 manufacture a packet using the PCI address, creating Read and Write tags (respectively) and creating a CRC field. Element 515 sends packet to shared memory node, and element 516 awaits successful acknowledgement of the function. Element 517 checks if the function has been successful. If the function is successful and the original request was a load command, element 519 delivers the data in the packet to the PCI bus. Element 518 ends execution of functions. If the function is successful and the original request was a store command, element 518 ends execution of functions. If the function has been unsuccessful (e.g., timeout or Bad CRC), element 515 resends the manufactured packet to the shared memory node.

Figure 6:
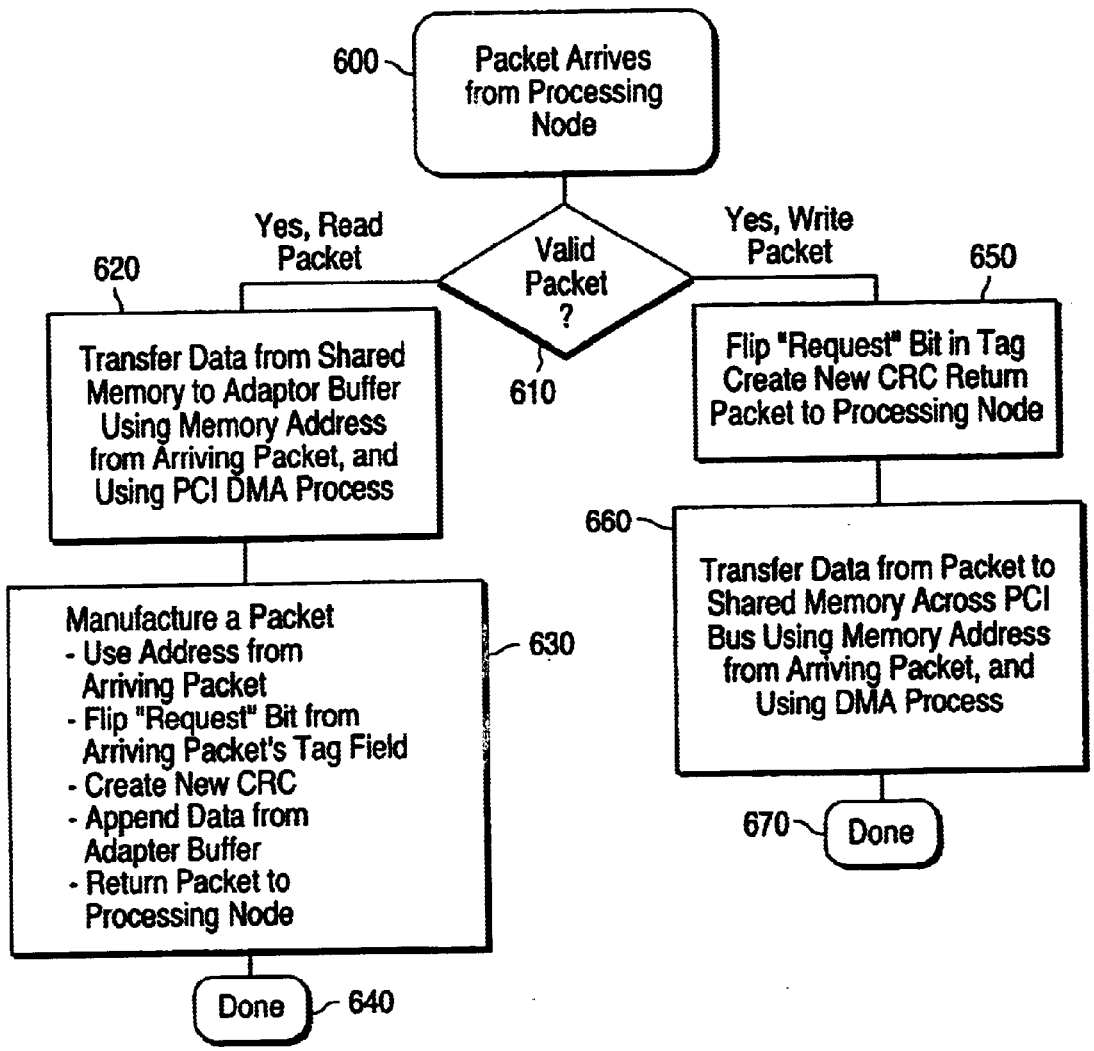
FIG. 6 illustrates a flowchart diagram of shared-memory PCI adapter processes, representing an embodiment of the invention.

Referring to FIG. 6, a flowchart of shared memory PCI adapter processes is depicted. Element 600 is coupled to element 610. Element 610 is coupled to elements 620,650. Element 620 is coupled to element 630, and element 630 is coupled to element 640. Element 650 is coupled to element 660, and element 660 is coupled to element 670.

Still referring to FIG. 6, element 600 acknowledges that there is a packet arriving from the processing node and is the input to element 610. Element 610 verifies whether the packet is a valid read packet, or a valid write packet. If a valid read packet is received, element 620 transfers data from shared memory to adapter buffer using the memory address from the arriving packet, and using a PCI DMA process. Element 630 manufactures a packet using the address from the arriving read packet, flipping the "request" bit from the arriving read packet's tag field, appending data from the adapter buffer, and finally returning the packet to the processing node. Element 640 ends execution of functions.

Referring to FIG. 6, if a valid write packet is received at element 610, element 650 flips the "request" bit in the tag, creates new CRC and returns packet to the processing node. Element 660 transfers data from packet to shared memory across the PCI bus using the memory address from the arriving write packet, and using DMA process. Element 670 ends execution of functions.

The posting of Writes, combining of Writes, and remote-party DMA combination as taught in this invention produce a non-obvious advantageous result: the system performance is improved. System performance is improved because the shared-memory node is the node as taught in U.S. Ser. No. 09/273,430, filed Mar. 19, 1999 to which all PRN's are connected. Much more data is flowing to shared-memory at the SMN than is generated by any single PRN. With Writes combined, what happens is that the SMN adapter 203 generates a single address-and-command phase at the SMN bus, then streams data, one data element per clock period, for a bust of length determined by how many data elements have been combined at the PRN. Thus there is much less overhead at the SMN. Since the SMN is the busy node, saving overhead there improves performance. Further, system performance is unexpectedly improved.

For Read commands, the adapter 201 performs additional actions designed to improve overall system performance and taught by this invention. One of these actions is the pre-fetching of Read data elements. As in the case of write posting and write combining, this is a speculative operation based on locality of reference.

Under software control, where certain regions of memory are known to be likely to have locality of reference, a pre-fetching technique can be used. Pre-fetching requires one particular element and can benefit from two others. By reference to FIG. 3, element 303, Speculative Read Control Register can be used by a programmer to activate and control pre-fetching. In the most general sense, if pre-fetching is activated via element 303 for a particular region for shared memory, element 308. The speculative and DMA calculator can determine from a recent history of Read patterns if a repetitive Read pattern is occurring and what stride of that pattern is. Then the hardware 305 can issue read commands to link 202 for processing at adapter 203, commands which were never issued by the host adapter of FIG. 1.

Then if the host adapter of FIG. 1 does subsequently issue a Read command to that location, the data will already be available in adapter 201 so that no delay is incurred in processing.

Also, if a pattern is established, the calculator 308 can direct the protocol generator to pre-fetch many of such elements, based only on the fact that an operation is occurring and that the receiving buffer 307 contents are below some threshold.

As yet another alternative, software known in the art as a Hardware Abstraction Layer (HAL) can be developed for interface to any of many different hardware elements. For this specific case, a layer of the type taught in U.S. Ser. No. 09/915,802, filed Jul. 25, 2001 describes such a HAL to a non-adjacent memory, the HAL being referenced here as TNSL. In that referenced disclosure, one function call is "Read". Another is "Read Buffer". In the case of Read Buffer, one of the parameters passed to TNSL is the number of dwords to read.

What is taught in this invention is a means, within TNSL, to calculate whether system performance will benefit most if TNSL translates the result to a string of Read commands or whether the system performance will be better if TNSL directs the hardware element 304 to DMA those dwords into a specifies location in PRN memory. This invention further teaches a hardware means included in 308 and 309 of FIG. 3, which then obtain the data from the SMN using the techniques described above by which adapter 201 obtains data without specific request from the host interface of FIG. 1, but in which adapter 201 uses DMA to place that data directly into PRN memory rather than depositing it into the receiving buffer 307. This invention further teaches the signaling by 304 the DMA Read Control means of software when the DMA operation is complete. The signaling means may be, under software control, either an interrupt or a value in a software-readable register which TNSL can read to determine the progress and/or completion of the DMS process.

The context of the invention can include computer systems. The context of the invention can also include computer systems for which the RAM subsystem or a portion thereof is connected to one or more CPUs.

The invention can also be included in a kit. The kit can include some, or all, of the components that compose the invention. The kit can be an in-the-field retrofit kit to improve existing systems that are capable of incorporating the invention. The kit can include software, firmware and/or hardware for carrying out the invention. The kit can also contain instructions for practicing the invention. Unless otherwise specified, the components, software, firmware, hardware and/or instructions of the kit can be the same as those used in the invention.

The term approximately, as used herein, is defined as at least close to a given value (e.g., preferably within 10% of, more preferably within 1% of, and most preferably within 0.1% of). The term substantially, as used herein, is defined as at least approaching a given state (e.g., preferably within 10% of, more preferably within 1% of, and most preferably within 0.1% of). The term coupled, as used herein, is defined as connected, although not necessarily directly, and not necessarily mechanically. The term deploying, as used herein, is defined as designing, building, shipping, installing and/or operating. The term means, as used herein, is defined as hardware, firmware and/or software for achieving a result. The term program or phrase computer program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system. The terms including and/or having, as used herein, are defined as comprising (i.e., open language). The terms a or an, as used herein, are defined as one or more than one. The term another, as used herein, is defined as at least a second or more.

Practical Applications of the Invention

A practical application of the invention that has value within the technological arts is providing lightweight protocols and methods to efficiently and correctly process memory accesses to the non-adjacent portions of RAM, via a serial link, in environments where there are multiple computing nodes, each with one or more CPUs and each with local, private RAM, and where there are one or more non-adjacent RAM units which are accessible by some or all of the computing nodes. There are virtually innumerable uses for the invention, all of which need not be detailed here.

Advantages of the Invention

A Load/Store micropacket handling system, representing an embodiment of the invention, can be cost effective and advantageous for at least the following reasons. The invention improves quality, and reduces costs compared to previous approaches.

All the disclosed embodiments of the invention disclosed herein can be made and used without undue experimentation in light of the disclosure. Although the best mode of carrying out the invention contemplated by the inventor(s) is disclosed, practice of the invention is not limited thereto. Accordingly, it will be appreciated by those skilled in the art that the invention may be practiced otherwise than as specifically described herein.

Further, the individual components need not be formed in the disclosed shapes, or combined in the disclosed configurations, but could be provided in virtually any shapes, and/or combined in virtually any configuration. Further, the individual components need not be fabricated from the disclosed materials, but could be fabricated from virtually any suitable materials.

Further, variation may be made in the steps or in the sequence of steps composing methods described herein.

Further, although the Load/Store micropacket handling system described herein can be a separate module, it will be manifest that the Load/Store micropacket handling system may be integrated into the system with which it is associated. Furthermore, all the disclosed elements and features of each disclosed embodiment can be combined with, or substituted for, the disclosed elements and features of every other disclosed embodiment except where such elements or features are mutually exclusive.

It will be manifest that various substitutions, modifications, additions and/or rearrangements of the features of the invention may be made without deviating from the spirit and/or scope of the underlying inventive concept. It is deemed that the spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

What is claimed is:

1. A method comprising:

interconnecting a compute node with a shared memory node;

translating a processor instruction into an interconnect command, wherein translating the processor instruction into the interconnect command includes translating a processor store instruction into an interconnect write command;

transforming the interconnect command into a direct memory access interconnect command;

transmitting the direct memory access interconnect command via a link medium;

performing an operation defined by the direct memory access interconnect command;

receiving a write interconnect command from a host;

buffering a data;

reporting to the host that write interconnect command has been performed;

holding the data for a period of time; and requesting that the host retry the write command at a later time.

2. A method comprising:

interconnecting a compute node with a shared memory node;

translating a processor instruction into an interconnect command, wherein translating the processor instruction into the interconnect command includes translating a processor store instruction into an interconnect write command;

transforming the interconnect command into a direct memory access interconnect command;

transmitting the direct memory access interconnect command via a link medium;

performing an operation defined by the direct memory access interconnect command; and combining a plurality of interconnect write commands into a single direct memory access interconnect write command of a plurality of data elements.

3. A method comprising:

interconnecting a compute node with a shared memory node;

translating a processor instruction into an interconnect command;

transforming the interconnect command into a direct memory access interconnect command;

transmitting the direct memory access interconnect command via a link medium; and
performing an operation defined by the direct memory access interconnect command;
wherein the shared memory node modifies a memory address statically.

4. A method comprising:
interconnecting a compute node with a shared memory node;
translating a processor instruction into an interconnect command;
transforming the interconnect command into a direct memory access interconnect command;
transmitting the direct memory access interconnect command via a link medium; and
performing an operation defined by the direct memory access interconnect command;
wherein transforming the interconnect command into the direct memory access interconnect command includes transforming the interconnect read command into a direct memory access interconnect read command; and
prefetching data with the compute node after translating the processor load instruction into the direct memory access interconnect read command.

5. The method of claim 4, wherein prefetching includes:
recording characteristics of a series of load instructions;
analyzing characteristics of the series of load instructions;
determining a pattern in the series of load instructions; and
speculatively issuing direct memory access interconnect read commands to the shared memory node as a function of the pattern.

6. The method of claim 5, wherein prefetching activation is performed via a link protocol responder.

7. The method of claim 6, wherein activation via the speculative read control register includes activation for a particular region of the shared memory node.

8. An apparatus comprising:
a computer network, including:
a compute node, having:
a compute node interconnect interface unit; and
a compute node interconnect adapter;
a link medium, coupled to the compute node; and
a shared memory node, coupled to the link medium, having:
a shared memory node interconnect interface unit; and
a shared memory node interconnect adapter;
wherein the compute node interconnect interface unit includes:
a processor bus;
a memory bus;
an interconnect bus;
a memory command translator; and
a memory address translator;
wherein the memory address translator includes a table of memory address ranges.

9. The apparatus of claim 8, wherein, wherein the table of memory address ranges includes a plurality of ranges associated with the interconnect bus.

10. The apparatus of claim 8, wherein the table of memory address ranges includes a plurality of ranges associated with the memory bus.

11. The apparatus of claim 8, wherein the table of memory address ranges is dynamically adjusted, with ranges determined at initialization time via a standardized test.

12. The apparatus of claim 11, wherein the standardized test includes reads and writes to certain required memory ranges within the compute node interconnect adapter.

13. An apparatus comprising:
a computer network, including:
a compute node, having:
a compute node interconnect interface unit; and
a compute node interconnect adapter;
a link medium, coupled to the compute node; and
a shared memory node, coupled to the link medium, having:
a shared memory node interconnect interface unit; and
a shared memory node interconnect adapter;
wherein the shared memory interconnect interface unit includes:
a processor bus;
a memory bus;
an interconnect bus;
a memory command translator; and
a memory address translator;
wherein the memory address translator includes a table of memory address ranges.

14. The apparatus of claim 13, wherein the table of memory address ranges includes a plurality of ranges associated with the interconnect bus.

15. The apparatus of claim 13, wherein the table of memory address ranges includes a plurality of ranges associated with the memory bus.

16. The apparatus of claim 13, wherein the table of memory address ranges is dynamically adjusted, with ranges determined at initialization time via a standardized test.

17. The apparatus of claim 16, wherein the standardized test includes reads and writes to certain required memory ranges within the shared memory node interconnect adapter.

18. An apparatus comprising:
a computer network, including:
a compute node, having:
a compute node interconnect interface unit; and
a compute node interconnect adapter;
a link medium, coupled to the compute node; and
a shared memory node, coupled to the link medium, having:
a shared memory node interconnect interface unit; and
a shared memory node interconnect adapter;
wherein the compute node interface adapter includes:
an interconnect bus interface;
an address translator;
a speculative-read control register;
a DMA-read control register;
a link protocol generator;
a link protocol responder;
a receive buffer;
a speculative-and-DMA read control calculator; and
a speculative-read control exerciser.

19. An apparatus comprising:
a computer network, including:
a compute node, having:
a compute node interconnect interface unit; and
a compute node interconnect adapter;
a link medium, coupled to the compute node; and
a shared memory node, coupled to the link medium, having:
a shared memory node interconnect interface unit; and a shared memory node interconnect adapter;
wherein the shared memory node interconnect adapter, includes:
an interconnect bus interface;
an address translator;
an interconnect read/write state machine;
a link protocol generator; and
a link protocol responder.

* * * * *